(12) United States Patent
Moon et al.

(10) Patent No.: US 10,474,901 B2
(45) Date of Patent: Nov. 12, 2019

(54) VIDEO INTERPRETATION APPARATUS AND METHOD

(71) Applicant: Electronics and Telecommunications Research Institute, Daejeon (KR)

(72) Inventors: Jin-Young Moon, Daejeon (KR); Kyu-Chang Kang, Daejeon (KR); Yong-Jin Kwon, Daejeon (KR); Kyoung Park, Daejeon (KR); Jong-Youl Park, Daejeon (KR); Jeun-Woo Lee, Gyeryong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 394 days.

(21) Appl. No.: 15/399,385

(22) Filed: Jan. 5, 2017

(65) Prior Publication Data

US 2017/0316268 A1 Nov. 2, 2017

(30) Foreign Application Priority Data

May 2, 2016 (KR) ........................ 10-2016-0053853

(51) Int. Cl.
*H04N 21/234* (2011.01)
*G06K 9/00* (2006.01)
*H04N 21/8405* (2011.01)

(52) U.S. Cl.
CPC .......... *G06K 9/00744* (2013.01); *G06K 9/00* (2013.01); *H04N 21/8405* (2013.01); *G06K 2009/00738* (2013.01); *H04N 21/23418* (2013.01)

(58) Field of Classification Search
CPC ..... G06K 2009/00738; G06K 9/00744; H04N 21/23418; H04N 21/8405
See application file for complete search history.

(56) References Cited

U.S. PATENT DOCUMENTS

| | | | |
|---|---|---|---|
| 6,564,263 B1 * | 5/2003 | Bergman | G06K 9/00 709/231 |
| 6,597,738 B1 | 7/2003 | Park et al. | |
| 9,189,546 B2 | 11/2015 | Kim et al. | |
| 2014/0139661 A1 | 5/2014 | Ahn | |

(Continued)

FOREIGN PATENT DOCUMENTS

| | | |
|---|---|---|
| KR | 10-2005-0016741 A | 2/2005 |
| KR | 10-2010-0077930 A | 7/2010 |

(Continued)

*Primary Examiner* — Siamak Harandi

(57) ABSTRACT

Disclosed herein are a video interpretation apparatus and method. The video interpretation apparatus includes an object information generation unit for generating object information based on objects in an input video, a relation generation unit for generating a dynamic spatial relation between the objects based on the object information, a general event information generation unit for generating general event information based on the dynamic spatial relation, a video information generation unit for generating video information including any one of a sentence and an event description based on the object information and the general event information, and a video descriptor storage unit for storing the object information, the general event information, and the video information.

17 Claims, 9 Drawing Sheets

(56) References Cited

U.S. PATENT DOCUMENTS

2014/0177946 A1 6/2014 Lim et al.
2014/0355823 A1* 12/2014 Kwon ................ G06K 9/00711
　　　　　　　　　　　　　　　　　　　　382/103

FOREIGN PATENT DOCUMENTS

| KR | 10-1228865 B1 | 2/2013 |
| KR | 10-1503268 B1 | 3/2015 |
| KR | 10-2015-0045335 A | 4/2015 |
| WO | WO 2013/165048 A1 | 7/2013 |

* cited by examiner

VIDEO INTERPRETATION APPARATUS AND METHOD

CROSS REFERENCE TO RELATED APPLICATION

This application claims the benefit of Korean Patent Application No. 10-2016-0053853, filed May 2, 2016, which is hereby incorporated by reference in its entirety into this application.

BACKGROUND OF THE INVENTION

1. Technical Field

The present invention generally relates to technology for interpreting a video using a general event generated based on objects in the video.

2. Description of the Related Art

In order to interpret a video, there is a need to recognize events corresponding to objects in the video. Conventional event recognition technology is capable of recognizing an important event in a learned domain or application. In order to recognize an event, an event classification model for extracting video features from a time interval and spatial region of an object occurrence and recognizing the event from the extracted video features via machine learning is generated.

However, since the event classification model generated in this way limitedly defines an event set only within a learned domain or application, it is impossible to recognize events occurring in other types of domains or applications that are different from the learned domain or application for the dataset. Such a conventional event classification model enables the interpretation of the features of videos that are included in a certain genre and are produced by a small number of experts. However, when current normal users upload videos (images) captured by smart phones to a Social Networking Service (SNS) site, events are too diverse to be interpreted using only a learned event classification model. Further, events, generated while a human being is interacting with other objects, are classified into several hundreds of types depending on the types of objects. Therefore, event analysis technology must construct an event classification model based on the interaction between the objects.

Meanwhile, Korean Patent Application Publication No. 10-2005-0016741 entitled "Method and Apparatus for Describing Motion Activity of Videos" relates to a method and apparatus for describing the motion activity of an object in a video using an accumulated motion histogram. This patent discloses a method for describing signal features for the entire video, an interval between representative images, and a specific temporal interval, which are difficult to represent using a conventional video motion indexing technique, and perceptual features for temporal and spatial distributions, degrees of variation, and patterns therefor.

However, Korean Patent Application Publication No. 10-2005-0016741 does not present a method for generating video information using dynamic spatial relations between objects in a video.

SUMMARY OF THE INVENTION

Accordingly, the present invention has been made keeping in mind the above problems occurring in the prior art, and an object of the present invention is to interpret a video using object information about objects in an input video, dynamic spatial relations between the objects, and information about a general event.

Another object of the present invention is to interpret a video using video information that includes a sentence or an event description.

A further object of the present invention is to interpret various types of videos.

In accordance with an aspect of the present invention to accomplish the above objects, there is provided a video interpretation apparatus, including an object information generation unit for generating object information based on objects in an input video; a relation generation unit for generating a dynamic spatial relation between the objects based on the object information; a general event information generation unit for generating general event information based on the dynamic spatial relation; a video information generation unit for generating video information including any one of a sentence and an event description based on the object information and the general event information; and a video descriptor storage unit for storing the object information, the general event information, and the video information.

The object information may include an ID, an object type, a time interval, and a spatial region of each of the objects.

The time interval of an object may consist of start and end frame numbers or a start and end time corresponding to each of the objects.

The spatial region may be represented by a Minimum Bounding Polygon (MBP) including each of the objects, for each frame, during the time interval.

The dynamic spatial relation may include a relation type which is based on variation in a spatial relation between the objects, time interval information, and a spatial region of a relation.

The general event information generation unit may select any one from among prepositions and adverbs corresponding to the dynamic spatial relation, selects only visually representable specific meanings, from among specific meanings corresponding to the prepositions and the adverbs, and generates relation IDs respectively corresponding to the visually representable specific meanings.

The general event information generation unit may generate general event information including a type, a time interval and a spatial region of an object, which are based on the object information corresponding to the relation IDs.

The video information generation unit may be configured to, when the video information including a sentence is generated, generate the video information including the sentence so that the video information includes a verb or a verb phrase corresponding to the general event information, a subject and an object corresponding to the object information, and the time interval.

The video information generation unit may be configured to, when the video information including an event description is generated, generate the video information including the event description based on the general event information.

The video descriptor storage unit may include an object information storage unit for storing the object information; and an event information storage unit for storing the general event information and the video information.

In accordance with another aspect of the present invention to accomplish the above objects, there is provided a video interpretation method performed by a video interpretation apparatus, including generating object information based on objects in an input video; generating a dynamic spatial relation between objects based on the object information; generating general event information based on the dynamic spatial relation; and generating video information including any one of a sentence and an event description based on the object information and the general event information.

The object information may include an ID, an object type, a time interval, and a spatial region of each of the objects.

The time interval of an object may consist of start and end frame numbers or start and end time corresponding to each of the objects.

The spatial region may be represented by a Minimum Bounding Polygon (MBP) including each of the objects, for each frame, during the time interval.

The dynamic spatial relation may include a relation type which is based on variation in a spatial relation between the objects, time interval information, and a spatial region of a relation.

Generating the general event information may include selecting any one from among prepositions and adverbs corresponding to the dynamic spatial relation; selecting only visually representable specific meanings, from among specific meanings corresponding to the prepositions and the adverbs; generating relation IDs respectively corresponding to the visually representable specific meanings; and generating general event information including a generation type, generation interval information, and generation area information, based on the object information corresponding to the relation IDs.

Generating the video information may be configured to, when the video information including a sentence is generated, generate the video information including the sentence so that the video information includes a verb or a verb phrase corresponding to the general event information, a subject and an object corresponding to the object information, and the time interval.

Generating the video information may be configured to, when the video information including an event description is generated, generate the video information including the event description based on the general event information.

The video interpretation method may further include storing the object information after generating the object information; storing the general event information after generating the general event information; and storing the video information after generating the video information.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
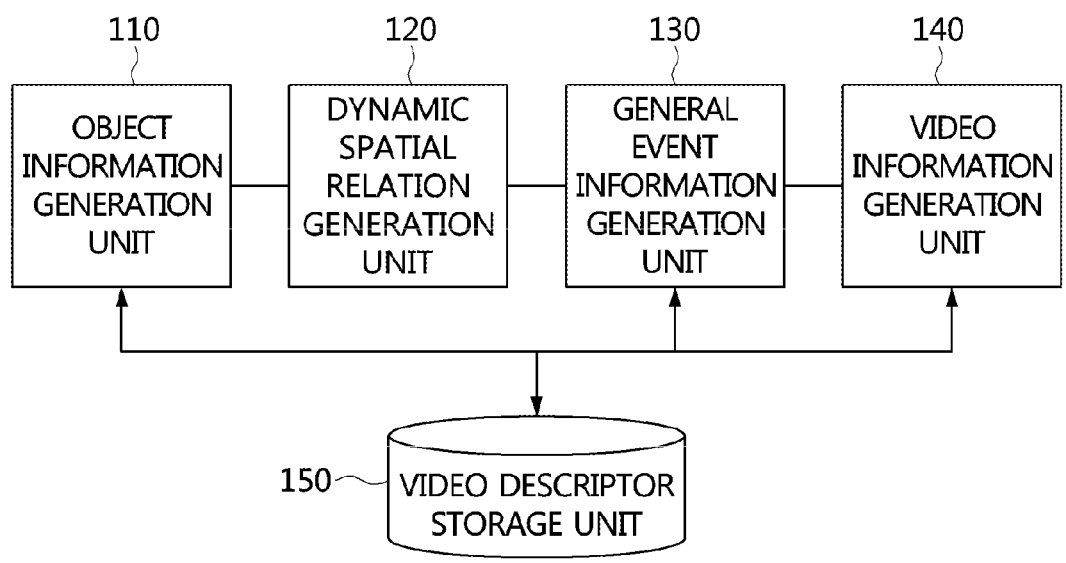
FIG. 1 is a block diagram showing a video interpretation apparatus according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

FIG. 1 is a block diagram showing a video interpretation apparatus according to an embodiment of the present invention.

Referring to FIG. 1, the video interpretation apparatus according to the embodiment of the present invention includes an object information generation unit 110, a Dynamic Spatial Relation (DSR) generation unit 120, a general event information generation unit 130, a video information generation unit 140, and a video descriptor storage unit 150.

The object information generation unit 110 may generate object information based on objects in an input video. Here, the object information generation unit 110 may track the objects in the video and generate object information corresponding to the tracked objects. The object information may include the ID, the object type, the time interval, and the spatial region of each of the objects. The time interval of an object may consist of start and end frame numbers or start and end time corresponding to each of the objects. The spatial region may be represented by a Minimum Bounding Polygon (MBP) including each of the objects, for each frame, during the time interval. Therefore, the spatial region may correspond to MBP information ranging from the start frame to the end frame of each of the objects. In this case, when the spatial region is stored in the shape of a rectangle, selected from among polygons, it may include the spatial region frame, X axis coordinate, Y axis coordinate, horizontal length (width), and vertical length (height) of each object. Here, when the spatial region is stored in the shape of a typical polygon, it may correspond to a set of coordinate points constituting the polygon. For example, the set of coordinate points may be $\{(x_1, y_1), (x_2, y_2), \ldots, (x_n, y_n)\}$.

Here, the object information generation unit 110 may store the generated object information in the video descriptor storage unit 150.

The dynamic spatial relation generation unit 120 may generate dynamic spatial relations between the objects based on the object information. Each dynamic spatial relation may include a relation type which is based on variation in a spatial relation between the objects, time interval information, and a spatial region of a relation.

For example, Into(A, B) may be a dynamic spatial relation in which object A is present near object B and then enters object B and is not seen any more. Further, On(A, B) may be a dynamic spatial relation in which object A is disposed on the surface of object B. That is, On(A, B) may be the dynamic spatial relation in which spatial regions for object A and object B intersect each other.

The general event information generation unit 130 may select any one from among prepositions and adverbs corresponding to the dynamic spatial relation, select only visually representable specific meanings from among specific meanings corresponding to the prepositions and adverbs, and generate relation IDs respectively corresponding to the visually representable specific meanings. In this case, the general event information generation unit 130 may delete visually unrepresentable specific meanings.

For example, in the case of "Into", relation IDs corresponding to Into1 ('to the inside of ~'), Into2 ('in the direction of ~'), and Into3 ('in contact with ~') may be generated.

Here, the general event information generation unit 130 may generate general event information based on the relation IDs. At this time, the general event information generation unit 130 may compare the relative sizes of objects with each other based on the dynamic spatial relations, and may generate the general event information using general event inference rules. The general event information may include generation type information, generation interval information, and generation area information based on the object information corresponding to the relation IDs. Here, when the generation area information is stored in the shape of a rectangle, selected from among polygons, it may include the generation area frame, X axis coordinate, Y axis coordinate, width, and height of general event information. In this regard, when the generation area information is stored in the shape of a typical polygon, it may correspond to a set of coordinate points constituting the polygon. For example, the set of coordinate points may be $\{(x_1, y_1), (x_2, y_2), \ldots, (x_n, y_n)\}$.

For example, the general event information may include GoIn(A, B)('A goes into B') corresponding to Into1(A, B), HeadFor(A, B)('A heads for B') corresponding to Into2(A, B), and CrashInto(A, B)('A crashes into B') corresponding to Into3(A, B).

Here, the general event information generation unit 130 may store the generated general event information in the video descriptor storage unit 150.

The video information generation unit 140 may generate video information based on both the object information and the general event information. The video information may include any one of a sentence and an event description. Here, the video information generation unit 140 may request the generation of video information including a sentence.

Here, when the generation request is approved, the video information generation unit 140 may generate video information including a sentence. Further, the video information generation unit 140 may generate video information including a sentence containing a verb or a verb phrase corresponding to the general event information, a subject and an object corresponding to object information, and the time interval.

Here, when the generation request is rejected, the video information generation unit 140 may generate video information including an event description. In this case, the video information generation unit 14 may generate video information including an event description based on the general event information.

The video information generation unit 140 may store the generated video information in the video descriptor storage unit 150.

Figure 2:
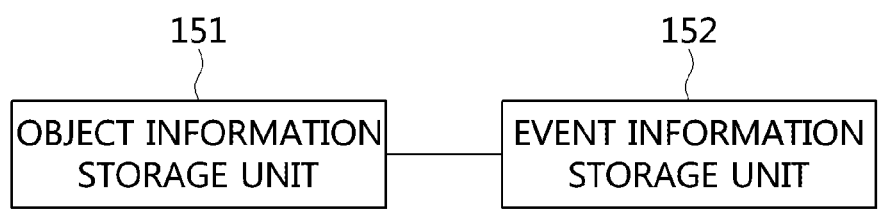
FIG. 2 is a block diagram showing in detail an example of the video descriptor storage unit shown in FIG. 1.

Referring to FIG. 2, the video descriptor storage unit 150 may include an object information storage unit 151 and an event information storage unit 152.

The object information storage unit 151 may store object information. Here, the object information storage unit 151 may store one or more objects. The object information may include an object ID, object type information, start frame and start time information, end frame and end time information, and a spatial region. For each frame, one or more pieces of the spatial region may be stored. Here, when the spatial region is stored in the shape of a rectangle, selected from among polygons, it may include the spatial region frame, X axis coordinate, Y axis coordinate, horizontal length (width), and vertical length (height) of each object. Here, when the spatial region is stored in the shape of a typical polygon, it may correspond to a set of coordinate points constituting the polygon. For example, the set of coordinate points may be $\{(x_1, y_1), (x_2, y_2), \ldots, (x_n, y_n)\}$.

The event information storage unit 152 may store general event information and video information. Here, the event information storage unit 152 may store one or more pieces of general event information. The general event information may include a relation ID, a generation type, generation interval information, generation area information, video information including a sentence, and video information including an event description. Here, one or more pieces of video information, each including a sentence, may be stored. In this case, the video information including a sentence may store a verb or a verb phrase, a subject, and objects. Here, the video information including an event description may store one or more pieces of generation area information. In this case, when the generation area information is stored in the shape of a rectangle, selected from among polygons, it may include the generation area frame, X axis coordinate, Y axis coordinate, width, and height of general event information. In this regard, when the generation area information is stored in the shape of a typical polygon, it may correspond to a set of coordinate points constituting the polygon. For example, the set of coordinate points may be $\{(x_1, y_1), (x_2, y_2), \ldots, (x_n, y_n)\}$.

FIG. 2 is a block diagram showing in detail an example of the video descriptor storage unit shown in FIG. 1.

Referring to FIG. 2, the video descriptor storage unit 150 may include an object information storage unit 151 and an event information storage unit 152.

The object information storage unit 151 may store object information. Here, the object information storage unit 151 may store one or more objects. The object information may include the object ID, object type information, start frame and start time information, end frame and end time information, and the spatial region of each object. For each frame, one or more pieces of the spatial region may be stored. In this case, when the spatial region is stored in the shape of a rectangle, selected from among polygons, it may include the spatial region frame, X axis coordinate, Y axis coordinate, width, and height of each object. Here, when the spatial region is stored in the shape of a typical polygon, it may correspond to a set of coordinate points constituting the polygon. For example, the set of coordinate points may be $\{(x_1, y_1), (x_2, y_2), \ldots, (x_n, y_n)\}$.

The event information storage unit 152 may store general event information and video information. Here, the event information storage unit 152 may store one or more pieces of general event information. The general event information may store a relation ID, a relation type, generation interval information, generation area information, video information including a sentence, and video information including an event description. Here, one or more pieces of video information, each including a sentence, may be stored. In this case, the video information including a sentence may store a verb or a verb phrase, a subject, and objects. Here, the video information including an event description may store one or more pieces of generation area information. In this case, when the generation area information is stored in the shape of a rectangle, selected from among polygons, it may include the generation area frame, X axis coordinate, Y axis coordinate, width, and height of general event information. In this regard, when the generation area information is stored in the shape of a typical polygon, it may correspond to a set of coordinate points constituting the polygon. For example, the set of coordinate points may be $\{(x_1, y_1), (x_2, y_2), \ldots, (x_n, y_n)\}$.

Figure 3:
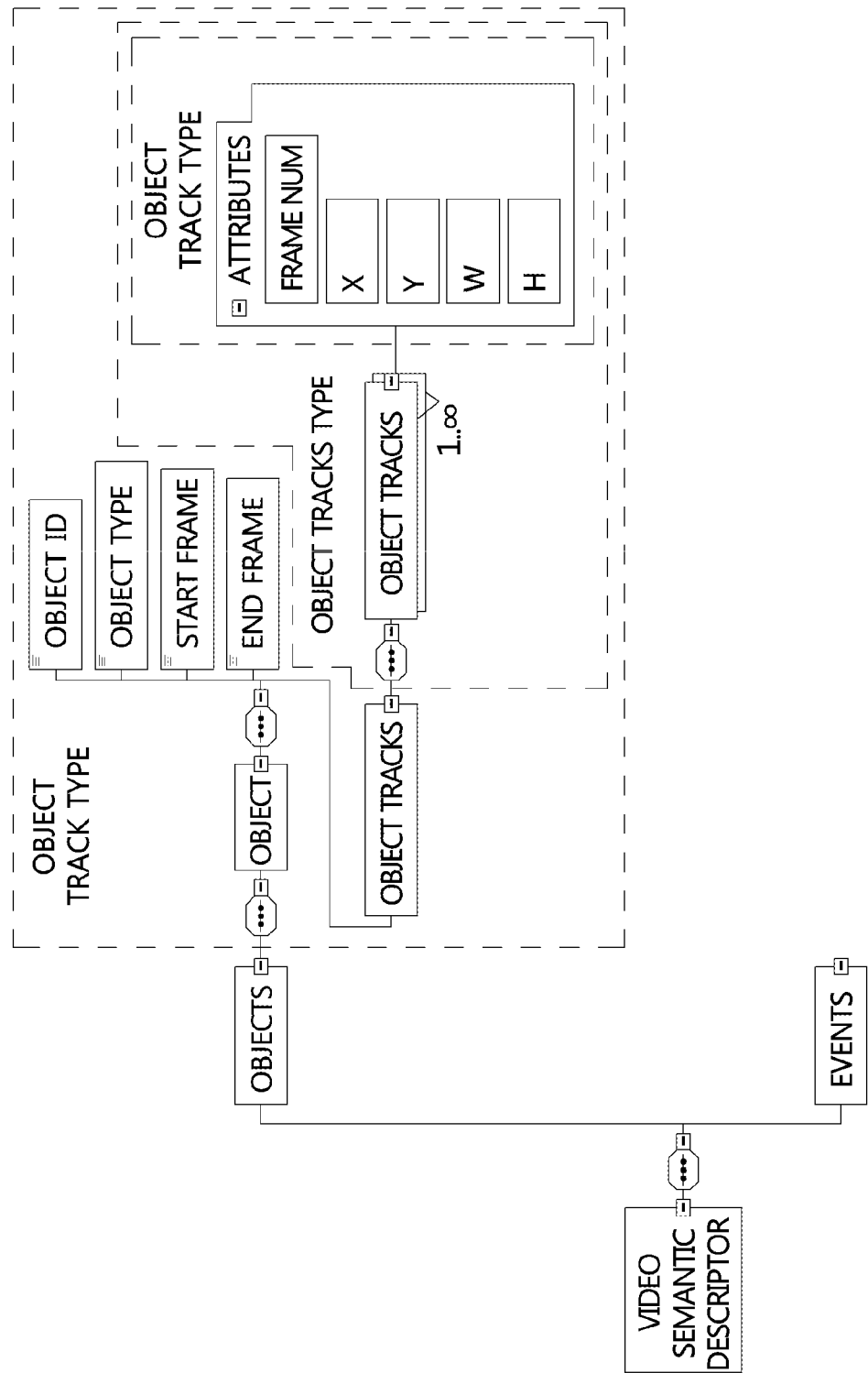
FIGS. 3 and 4 are diagrams showing examples of the data structure of the video descriptor storage unit shown in FIG. 1.
Figure 4:
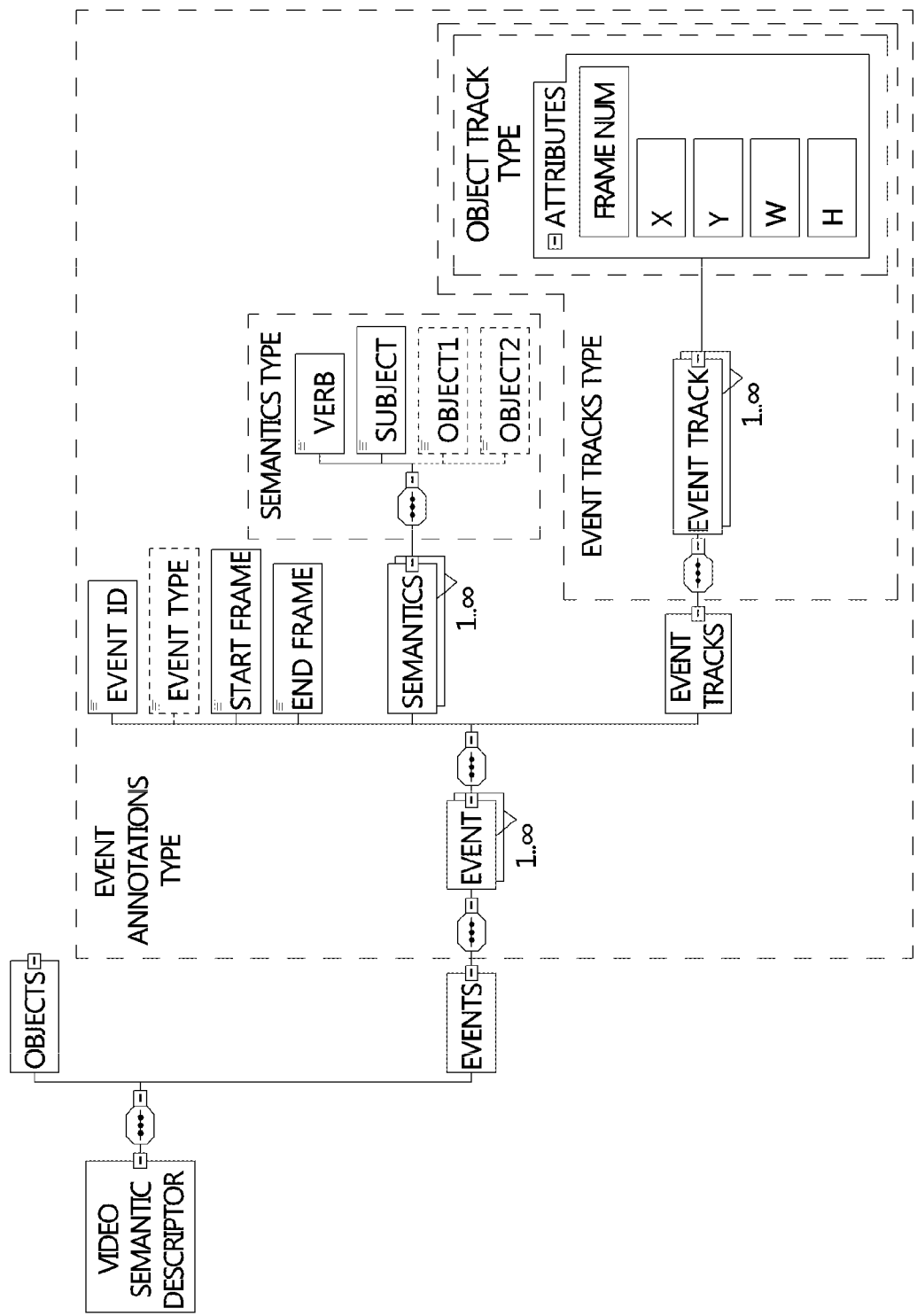

FIGS. 3 and 4 are diagrams showing an example of the data structure of the video descriptor storage unit shown in FIG. 1.

Referring to FIG. 3, the data structure of the video descriptor storage unit 150 may be implemented as a data structure corresponding to objects and events. Here, the video descriptor storage unit 150 may store objects such that one or more pieces of object information (objects 1, ..., ∞) are stored. The object information may include an object ID (ObjectID), object type information (ObjectType), start frame and start time information (StartFrame), end frame and end time information (EndFrame), and a spatial region (ObjectTracks). For each frame, one or more pieces of the spatial region (ObjectTracks) (e.g. Object Tracks 1, ..., ∞) may be stored. Here, the spatial region (ObjectTracks) may include the spatial region frame (frameNum), X axis coordinate (X), Y axis coordinate (Y), width (W), and height (H) of each object.

Referring to FIG. 4, the video descriptor storage unit 150 may store events such that one or more pieces of general event information (e.g. Events 1, ..., ∞) are stored.

The general event information may store a relation ID (EventID), a generation type (EventType), generation interval information (StartFrame and EndFrame), video information including a sentence (Semantics), and video information including an event description (EventTracks). Here, one or more pieces of video information (Semantics 1, ... ∞), each including a sentence, may be stored. Further, the video information including a sentence may store a verb or a verb phrase (Verb), a subject (Subject), and objects (Object1 and Object2). Here, video information including an event description (EventTracks) may store one or more pieces of generation area information (EventTracks 1, ..., ∞). Here, the generation area information (EventTrack) may include the generation area frame (frameNum), X axis coordinate (X), Y axis coordinate (Y), width (W), and height (H) of each general event.

Figure 5:
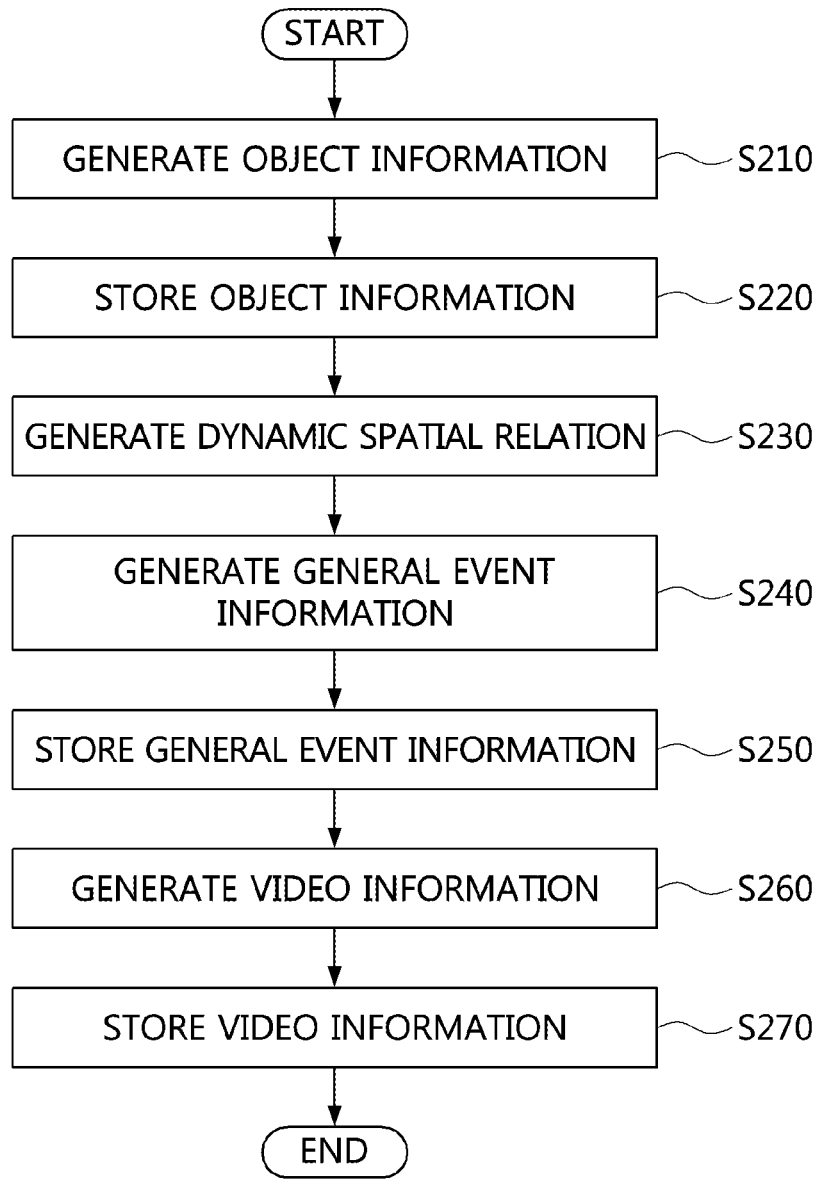
FIG. 5 is an operation flowchart showing a video interpretation method according to an embodiment of the present invention.

FIG. 5 is an operation flowchart showing a video interpretation method according to an embodiment of the present invention.

Referring to FIG. 5, the video interpretation method according to the embodiment of the present invention generates object information at step S210.

That is, at step S210, the object information may be generated based on objects in an input video. Here, at step S210, the objects in the video may be tracked, and object information corresponding to the tracked objects may be generated. The object information may include the ID, object type information, time interval, and spatial region of each object. The time interval of an object may consist of start and end frame numbers or start and end time corresponding to each of the objects. The spatial region may be represented by a Minimum Bounding Polygon (MBP) including each of the objects, for each frame, during the time interval. Therefore, the spatial region may correspond to MBP information ranging from the start frame to the end frame of each of the objects. In this case, when the spatial region is stored in the shape of a rectangle, selected from among polygons, it may include the spatial region frame, X axis coordinate, Y axis coordinate, width), and height of each object. Here, when the spatial region is stored in the shape of a typical polygon, it may correspond to a set of coordinate points constituting the polygon. For example, the set of coordinate points may be $\{(x_1, y_1), \ldots, (x_2, y_2)\}$.

Further, the video interpretation method may store the object information at step S220.

That is, at step S220, the generated object information may be stored in the video descriptor storage unit 150.

Further, the video interpretation method may generate dynamic spatial relations at step S230.

That is, at step S230, dynamic spatial relations between objects may be generated based on the object information. Each dynamic spatial relation may include a relation type which is based on variation in a spatial relation between the objects, time interval information, and a spatial region of a relation.

For example, Into(A, B) may be a dynamic spatial relation in which object A is present near object B and then enters object B and is not seen any more. Further, On(A, B) may be a dynamic spatial relation in which object A is disposed on the surface of object B. That is, On(A, B) may be the dynamic spatial relation in which spatial regions for object A and object B intersect each other.

Further, the video interpretation method may generate general event information at step S240.

That is, at step S240, the general event information may be generated based on the dynamic spatial relations.

Figure 6:
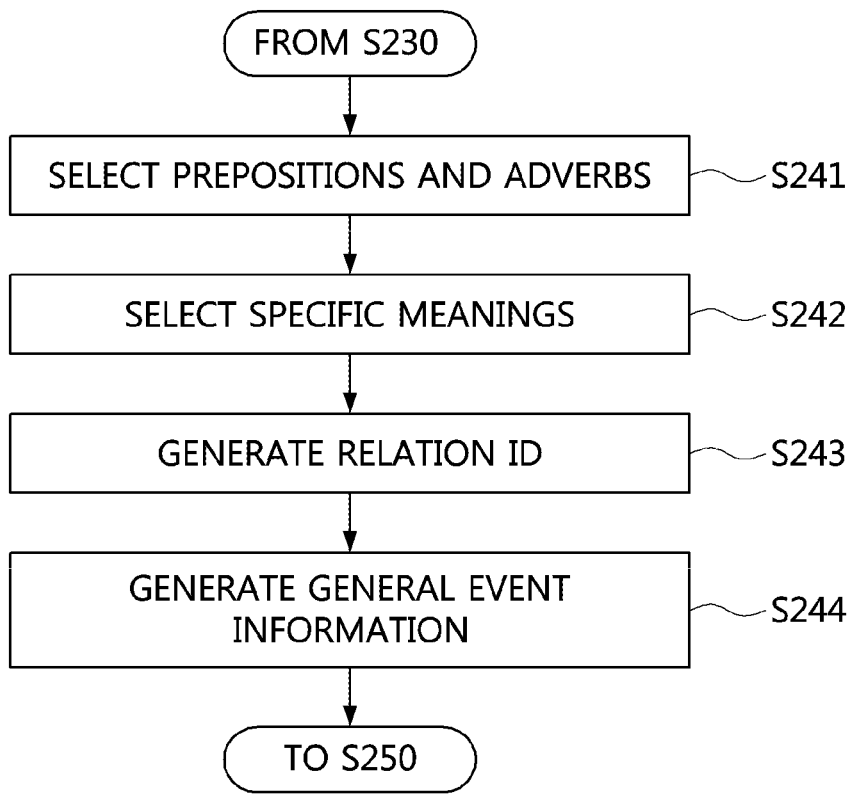
FIG. 6 is an operation flowchart showing in detail the general event generation step shown in FIG. 5.

Here, referring to FIG. 6, in a procedure corresponding to step S240, prepositions and adverbs may be selected at step S241.

That is, at step S241, any one of the prepositions and adverbs corresponding to the dynamic spatial relations may be selected.

Further, in the procedure corresponding to step S240, specific meanings may be selected at step S242.

That is, at step S242, only visually representable specific meanings may be selected from among specific meanings corresponding to the prepositions and the adverbs.

Further, in the procedure corresponding to step S240, relation IDs may be generated at step S243.

That is, at step S243, relation IDs corresponding to respective visually representable specific meanings may be generated. For example, in the case of 'Into', relation IDs corresponding to Into1 ('to the inside of ~'), Into2 ('in the direction of ~') and Into3 ('in contact with ~') may be generated. Here, at step S243, visually unrepresentable specific meanings may be deleted.

Furthermore, in the procedure corresponding to step S240, general event information may be generated at step S244.

That is, at step S244, the relative sizes of objects may be compared with each other based on the dynamic spatial relations, and the general event information may be generated using general event inference rules. The general event information may include generation type information, generation interval information, and generation area information based on the object information corresponding to the relation IDs. Here, when the generation area information is stored in the shape of a rectangle, selected from among polygons, it may include the generation area frame, X axis coordinate, Y axis coordinate, width, and height of general event information. In this regard, when the generation area information is stored in the shape of a typical polygon, it may correspond to a set of coordinate points constituting the polygon. For example, the set of coordinate points may be $\{(x_1, y_1), (x_2, y_2), \ldots, (x_n, y_n)\}$. For example, the general event information may include GoIn(A, B)('A goes into B') corresponding to Into1(A, B), HeadFor(A, B)('A heads for B') corresponding to Into2(A, B), and CrashInto(A, B)('A crashes into B') corresponding to Into3(A, B).

Further, the video interpretation method may store the general event information at step S250.

That is, at step S250, the generated general event information may be stored in the video descriptor storage unit 150.

Furthermore, the video interpretation method may generate video information at step S260.

That is, at step S260, the video information may be generated based on object information and general event information.

Figure 7:
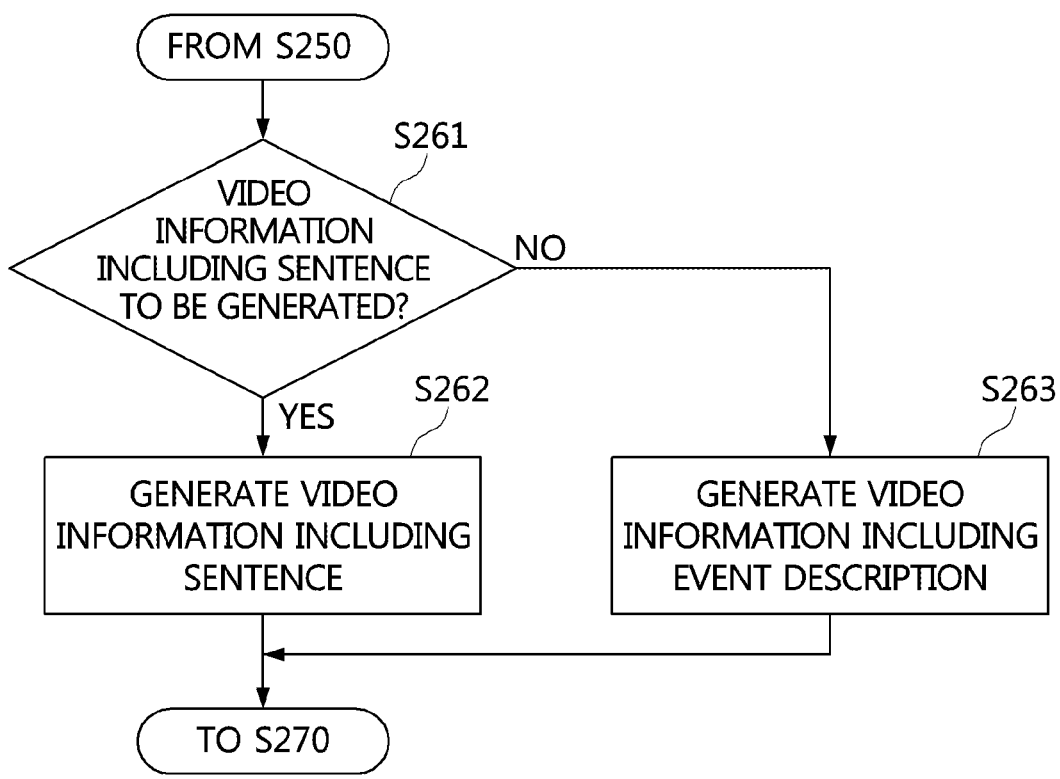
FIG. 7 is an operation flowchart showing in detail the video information generation step shown in FIG. 5.

Referring to FIG. 7, in a procedure corresponding to step S260, the generation of video information including a sentence may be requested at step S261. The video information may include any one of a sentence and an event description.

That is, when the generation request is approved at step S261, video information including a sentence may be generated at step S262.

Here, at step S262, video information including a sentence, which includes a verb or a verb phrase corresponding to the general event information, a subject and an object corresponding to object information, and the time interval, may be generated.

In contrast, when the generation request is rejected at step S261, video information including an event description may be generated at step S263.

Here, at step S263, video information including an event description may be generated based on the general event information.

FIG. 6 is an operation flowchart showing in detail the general event information generation step shown in FIG. 5.

Referring to FIG. 6, in a procedure corresponding to step S240, prepositions and adverbs may be selected at step S241.

That is, at step S241, any one of prepositions and adverbs corresponding to the dynamic spatial relations may be selected.

Further, in the procedure corresponding to step S240, specific meanings may be selected at step S242.

That is, at step S242, only visually representable specific meanings may be selected from among specific meanings corresponding to prepositions and adverbs.

In the procedure corresponding to step S240, relation IDs may be generated at step S243.

That is, at step S243, relation IDs corresponding to respective visually representable specific meanings may be generated. For example, in the case of 'Into', relation IDs corresponding to Into1 ('to the inside of ~'), Into2 ('in the direction of ~') and Into3 ('in contact with ~') may be generated. Here, at step S243, visually unrepresentable specific meanings may be deleted.

Furthermore, in the procedure corresponding to step S240, general event information may be generated at step S244.

That is, at step S244, the relative sizes of objects are compared with each other based on dynamic spatial relations, and general event information may be generated using general event interference rules. The general event information may include generation type information, generation interval information, and generation area information based on the object information corresponding to the relation IDs. Here, when the generation area information is stored in the shape of a rectangle, selected from among polygons, it may include the generation area frame, X axis coordinate, Y axis coordinate, width, and height of general event information. In this regard, when the generation area information is stored in the shape of a typical polygon, it may correspond to a set of coordinate points constituting the polygon. For example, the set of coordinate points may be $\{(x_1, y_1), (x_2, y_2), \ldots, (x_n, y_n)\}$. For example, the general event information may include GoIn(A, B)('A goes into B') corresponding to Into1(A, B), HeadFor(A, B)('A heads for B') corresponding to Into2(A, B), and CrashInto(A, B)('A crashes into B') corresponding to Into3(A, B).

FIG. 7 is an operation flowchart showing in detail the video information generation step shown in FIG. 5.

Referring to FIG. 7, in a procedure corresponding to step S260, the generation of video information including a sentence may be requested at step S261. The video information may include any one of a sentence and an event description.

That is, when the generation request is approved at step S261, video information including a sentence may be generated at step S262.

Here, at step S262, video information including a sentence, which includes a verb or a verb phrase corresponding to the general event information, a subject and an object corresponding to object information, and the time interval, may be generated.

In contrast, when the generation request is rejected at step S261, video information including an event description may be generated at step S263.

Here, at step S263, video information including an event description may be generated based on the general event information.

The above-described video interpretation apparatus and method may query, extract, and receive object information, general event information, and video information using the video descriptor storage unit 150.

Figure 8:
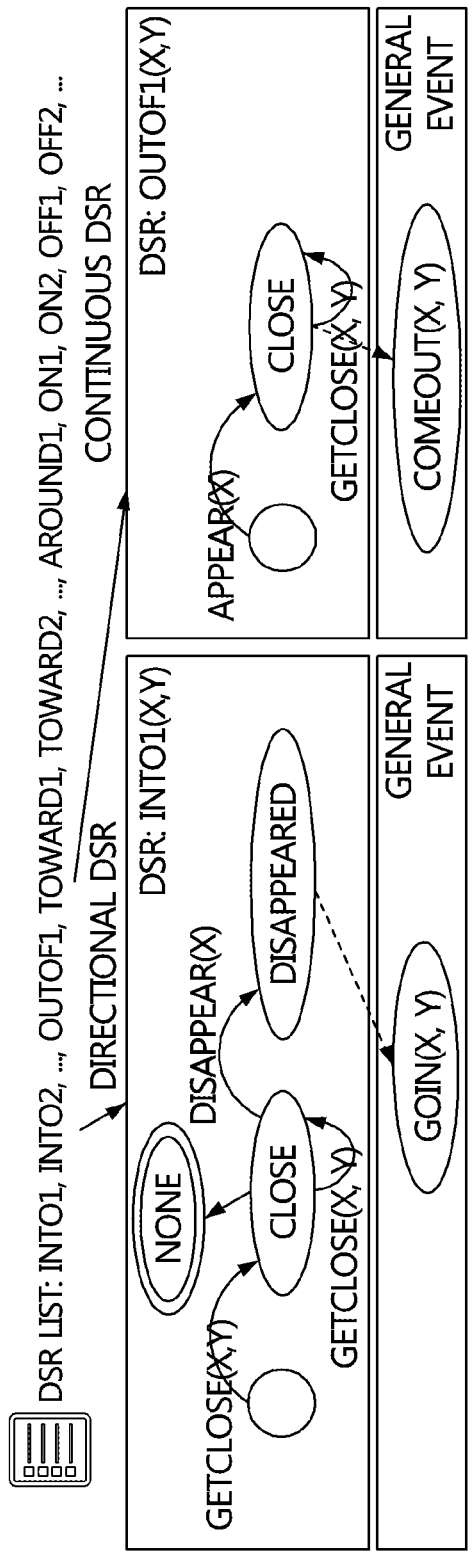
FIG. 8 is a diagram showing a procedure for generating dynamic spatial relations and general events according to an embodiment of the present invention.

FIG. 8 is a diagram showing a procedure for generating Dynamic Spatial Relations (DSR) and general events according to an embodiment of the present invention.

Referring to FIG. 8, it can be seen that a relation list (DSR list) includes relation IDs, such as Into1, Into2, . . . , OutOf1, Toward1, Toward2, . . . , Around1, On1, On2, Off1, and Off2. Here, it can be seen that a directional DSR list includes directional relation IDs, such as Into1, Into2, . . . , OutOf1, Toward1, Toward2, . . . , Around1. Here, it can be seen that a continuous DSR list includes continuous relation IDs, such as On1, On2, Off1, and Off2.

In the directional DSR list, Into1(X, Y) may be recognized when the spatial regions of two objects X and Y intersect each other (GetClose(X, Y)) and object X disappears (Disappear(X)). The generation area information for a general event may be calculated based on the spatial region of the two objects X and Y. Here, Into1(X, Y) may generate general event information corresponding to GoIn(X, Y)('object X goes into object Y'). Further, in the directional DSR list, OutOf1(X, Y) may be recognized when the spatial region of object X intersects the spatial region of object Y (GetClose(X, Y)) at the moment at which object X appears (Appear(X)). Here, the generation area information for the general event may be calculated based on the spatial region of the two objects X and Y. Here, OutOf1(X, Y) may generate general event information corresponding to Come-Out (X, Y)('object X comes out of object Y').

Figure 9:
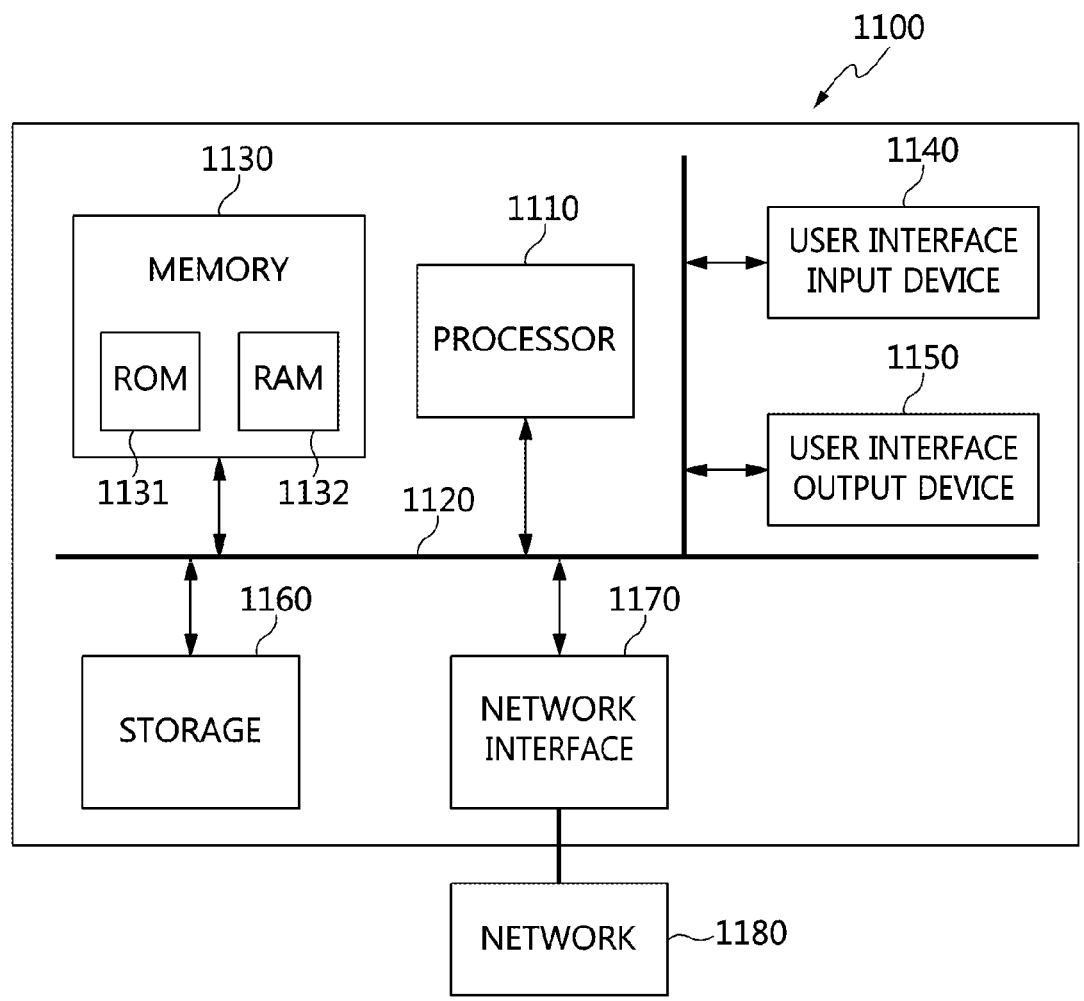
FIG. 9 is a block diagram showing a computer system according to an embodiment of the present invention.

FIG. 9 is a block diagram showing a computer system according to an embodiment of the present invention.

Referring to FIG. 9, the embodiment of the present invention may be implemented in a computer system 1100, such as a computer-readable storage medium. As shown in FIG. 9, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory may include Read Only Memory (ROM) 1131 or Random Access Memory (RAM) 1132.

As described above, the present invention may interpret a video using object information about objects in an input video, dynamic spatial relations between the objects, and information about a general event.

Further, the present invention may interpret a video using video information that includes a sentence or an event description.

Furthermore, the present invention may interpret various types of videos.

As described above, in the video interpretation apparatus and method according to the present invention, the configurations and schemes in the above-described embodiments are not limitedly applied, and some or all of the above embodiments can be selectively combined and configured so that various modifications are possible.

What is claimed is:

1. A video interpretation apparatus, comprising:
   an object information generation unit for generating object information based on objects in an input video;
   a relation generation unit for generating a dynamic spatial relation between the objects based on the object information;
   a general event information generation unit for generating general event information based on the dynamic spatial relation;
   a video information generation unit for generating video information including any one of a sentence and an event description based on the object information and the general event information; and
   a video descriptor storage unit for storing the object information, the general event information, and the video information,
   wherein the object information includes an ID and a spatial region of each of the objects for a specific frame in a video,
   wherein the spatial region is represented by a Minimum Bounding Polygon (MBP) including each of the objects, for the specific frame, and
   wherein the dynamic spatial relation includes a relation type which is based on variation in a spatial relation between the objects, time interval information, and a spatial region of a relation.

2. The video interpretation apparatus of claim 1, wherein the object information further includes an object type and a time interval of each of the objects.

3. The video interpretation apparatus of claim 2, wherein the time interval includes start and end frame numbers or start and end time corresponding to each of the objects.

4. The video interpretation apparatus of claim 1, wherein the general event information generation unit selects any one from among prepositions and adverbs corresponding to the dynamic spatial relation, selects only visually representable specific meanings, from among specific meanings corresponding to the prepositions and the adverbs, and generates relation IDs respectively corresponding to the visually representable specific meanings.

5. The video interpretation apparatus of claim 4, wherein the general event information generation unit generates general event information including a type, a time interval and a spatial region of an object, which are based on the object information corresponding to the relation IDs.

6. The video interpretation apparatus of claim 5, wherein the video information generation unit is configured to, when the video information including the sentence is generated, generate the video information including the sentence so that the video information includes a verb or a verb phrase corresponding to the general event information, a subject and an object corresponding to the object information, and the time interval.

7. The video interpretation apparatus of claim 6, wherein the video information generation unit is configured to, when the video information including the event description is generated, generate the video information including the event description based on the general event information.

8. The video interpretation apparatus of claim 7, wherein the video descriptor storage unit comprises:
   an object information storage unit for storing the object information; and
   an event information storage unit for storing the general event information and the video information.

9. A video interpretation method performed by a video interpretation apparatus, comprising:
   generating object information based on objects in an input video;
   generating a dynamic spatial relation between objects based on the object information;
   generating general event information based on the dynamic spatial relation; and
   generating video information including any one of a sentence and an event description based on the object information and the general event information,
   wherein the object information includes an ID and a spatial region of each of the objects for a specific frame in a video,
   wherein the spatial region is represented by a Minimum Bounding Polygon (MBP) including each of the objects, for the specific frame, and
   wherein the dynamic spatial relation includes a relation type which is based on variation in a spatial relation between the objects, time interval information, and a spatial region of a relation.

10. The video interpretation method of claim 9, wherein the object information further includes an object type and a time interval of each of the objects.

11. The video interpretation method of claim 10, wherein the time interval includes start and end frame numbers or start and end time corresponding to each of the objects.

12. The video interpretation method of claim 9, wherein generating the general event information comprises:
    selecting any one from among prepositions and adverbs corresponding to the dynamic spatial relation;

selecting only visually representable specific meanings, from among specific meanings corresponding to the prepositions and the adverbs;

generating relation IDs respectively corresponding to the visually representable specific meanings; and generating general event information including a generation type, generation interval information, and generation area information, based on the object information corresponding to the relation IDs.

13. The video interpretation method of claim 12, wherein generating the video information is configured to, when the video information including the sentence is generated, generate the video information including the sentence so that the video information includes a verb or a verb phrase corresponding to the general event information, a subject and an object corresponding to the object information, and the time interval.

14. The video interpretation method of claim 13, wherein generating the video information is configured to, when the video information including the event description is generated, generate the video information including the event description based on the general event information.

15. The video interpretation method of claim 9, further comprising:

storing the object information after generating the object information;

storing the general event information after generating the general event information; and storing the video information after generating the video information.

16. A video interpretation method performed by a video interpretation apparatus, comprising:

generating object information based on objects in an input video;

generating a dynamic spatial relation between objects based on the object information;

generating general event information based on the dynamic spatial relation; and generating video information including any one of a sentence and an event description based on the object information and the general event information, wherein generating the general event information comprises:

selecting any one from among prepositions and adverbs corresponding to the dynamic spatial relation;

selecting only visually representable specific meanings, from among specific meanings corresponding to the prepositions and the adverbs;

generating relation IDs respectively corresponding to the visually representable specific meanings; and generating the general event information based on the object information corresponding to the relation IDs.

17. The video interpretation method of claim 16, wherein the dynamic spatial relation includes a relation type which is based on variation in a spatial relation between the objects, time interval information, and a spatial region of a relation.

* * * * *